Jan. 28, 1930. O. J. HORGER 1,745,216
AXLE LUBRICATION
Filed Oct. 17, 1927

INVENTOR.
Oscar J. Horger
by Cann & Cann Gravely
HIS ATTORNEYS.

Patented Jan. 28, 1930

1,745,216

UNITED STATES PATENT OFFICE

OSCAR J. HORGER, OF CANTON, OHIO, ASSIGNOR TO THE TIMKEN ROLLER BEARING COMPANY, OF CANTON, OHIO, A CORPORATION OF OHIO

AXLE LUBRICATION

Application filed October 17, 1927. Serial No. 226,567.

My invention relates to the lubrication of railway axles, and especially to axles that are equipped with roller bearings. The principal object of the invention is to provide for the maintenance of a fluid lubricant at a fairly constant level so long as the supply lasts. Another principal object is to provide for an ample supply reservoir suitably arranged and adapted for automatically feeding the lubricant. Another object is to adapt the closure cap of the roller bearing for use as a lubricator. The invention consists principally in making the closure cap in the form of a reservoir of considerable capacity with a passageway leading from the lower part thereof to the roller bearing. It also consists in the construction and combination of parts hereinafter described and claimed.

Figure 1:
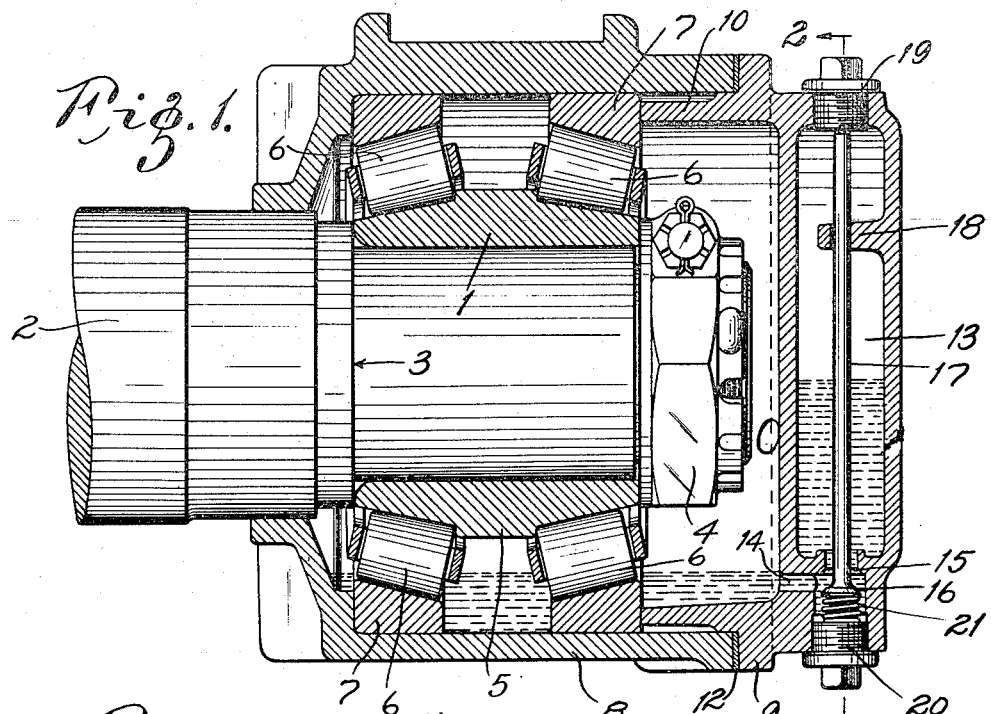
Figure 2:
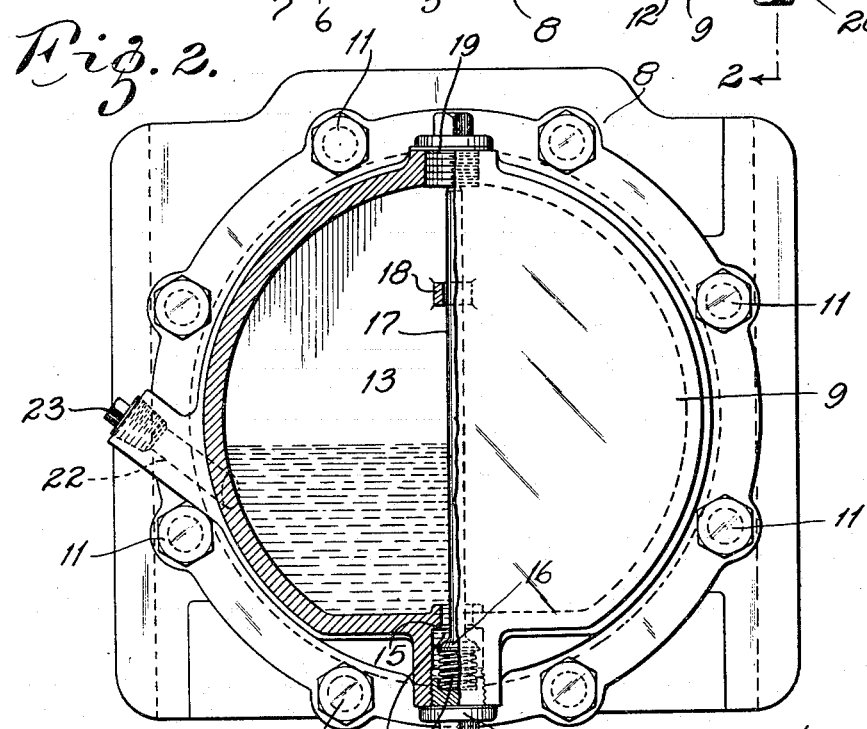

In the accompanying drawing, which forms part of this specification, and wherein like reference numerals refer to like parts wherever they occur, Fig. 1 shows the end portion of an axle in elevation and also shows in longitudinal section a roller bearing mounted thereon, including the housing and the closure of said bearing; and Fig. 2 is a view looking endwise of the axle, showing on the right side an end elevation and showing on the left side a cross-section on the line 2—2 of Fig. 1.

In the construction illustrated in the drawing, an inner raceway member 1 is mounted on the axle 2 near the end thereof with its inner end bearing against a shoulder 3 on the axle and held in place by a nut 4 mounted on the end of the axle. This inner raceway member has a circumferential rib 5 about midway of its length and bearing surfaces that taper from said rib towards the respective ends of said inner raceway member. Co-operating with each of said bearing surfaces is a circular series of taper rollers 6 that also cooperate with cups 7 or other raceway members that are seated in a suitable housing 8. The inner end of this housing has a central hole of proper size to accommodate the axle; and preferably is provided with a felt ring or other suitable device for excluding dust from the interior of the housing. In the construction illustrated, the outer end of the housing is closed by a suitable closure cap 9. This cap has an inwardly extending annular flange 10 adapted to enter the housing and bear against the end of the outer of the cups 7 or outer raceway members. The closure cap overlaps the end of the housing and is secured thereto by means of cap screws 11, with one or more shims 12 intervening between them so as to insure the proper adjustment of the bearing members.

According to the present invention, the closure cap is made hollow to constitute an airtight chamber or reservoir 13 for the lubricant. To adapt it for lubricating purposes, a hole or passageway 14 extends from the hollow interior thereof to the inner face of the cap slightly below the level at which it is desired to maintain the lubricant in the bearings. In the construction illustrated, this hole has a horizontal portion extending from the inner face of the closure cap and communicating with a vertical portion which in turn communicates with the hollow chamber that constitutes the oil reservoir. The bottom end of this vertical portion is beveled to form a valve seat 15 for a valve 16 whose stem 17 extends upwardly through said reservoir and a guide perforation in a lug 18 formed or mounted on the interior of the closure cap to a point near the top of the closure cap. Opposite this point the closure cap is provided with a threaded hole, which is closed by a threaded nut or plug 19. A second nut or plug 20 closes a threaded hole in the bottom of the cup and serves as the lower abutment for a coiled spring 21 which is located in the upper portion of said hole and whose upper end bears against the bottom of said valve 16. The parts are so arranged and adjusted that, when the top plug 19 is removed, the spring 21 will lift the valve 16 against its seat 15 and thereby shut off communication between the oil reservoir 13 and the interior of the housing; and in this position, the upper end of the valve stem 17 is in position for the upper plug 19 to bear against when it is being screwed into position. By this arrangement, the unscrewing of the top plug permits the spring to close the valve, whereas the tightening of the top plug forces the valve away from its seat and thereby opens communication between the oil reservoir and the interior of the housing. The lower plug serves as a means of properly setting the valve and adjusting the spring; and also to permit drainage. Preferably the housing is provided with a passageway 22 extending therethrough from a point conveniently accessible from the outside and opening into the interior thereof. The outer end of this passageway is closed by a plug 23 or other suitable closure. A suitable location for such passageway is in the side of the closure cap, as illustrated in Fig. 2.

The operation of the device is as follows: Lubricating oil is first poured into the interior of the housing to the predetermined level through the opening provided therefor in the side of the housing or of the closure cap. The filler plug at the top of the closure cap is removed, whereupon the valve is seated by its spring and thereby shuts off communication between the reservoir and the interior of the housing. The reservoir is then filled with oil and the filler plug screwed into place. The communication between the reservoir and the interior of the housing is thereby opened, but has little or no effect on the level of the lubricant in the housing. When, in the course of use, the level of the lubricant in the housing falls, air finds its way into the reservoir and such amount of lubricant as may be necessary to restore the level in the housing passes thereto from the reservoir. The level of the lubricant in the housing is thus maintained at a substantially constant level so long as there is any lubricant in the reservoir; and as it is feasible to make the reservoir with a capacity several times the capacity of the housing, the device will require replenishing only at long intervals.

It is noted that by utilizing the closure cap as an oil reservoir, the passageway to the interior of the housing is very short and direct and not liable to become clogged. It is also noted that by utilizing for a reservoir a closure cap, which is required for other purposes, and which is very conveniently located for refilling as well as for the feeding operation, the construction is very simple, compact and efficient and the advantages of lubrication are attained without substantial increase in the cost of a bearing.

What I claim is:

1. The combination of an axle, a housing encasing its end portion and a roller bearing between said housing and said axle, said housing having a closure for the end thereof and having an inward extension for cooperation with the roller bearing, and said closure having an airtight lubricant chamber with a filling hole in the upper portion thereof and a removable plug for said hole, and a passageway leading from the lower portion of said lubricant chamber to the lower portion of the bearing chamber.

2. The combination of an axle, a housing encasing its end portion and a roller bearing between said housing and said axle, said housing having a closure for the end thereof, and said closure having an airtight lubricant chamber with a filling hole in the upper portion thereof and a removable plug for said hole, accessible for filling when said closure is in place, a passageway leading from the lower portion of said lubricant chamber to the lower portion of the bearing chamber, and a valve in said passageway.

3. The combination with an axle, a housing for the end portion thereof and a roller bearing between said axle and said housing, of a closure for the end of said housing, said closure having an airtight lubricant chamber whose walls are integral with said closure and a passageway extending from the lower portion of said chamber to the inside of said housing.

4. The combination with an axle, a housing for the end portion thereof and a roller bearing between said axle and said housing, of a closure for the end of said housing, said closure having an airtight lubricant chamber whose walls are integral with said closure and a passageway extending from the lower portion of said chamber to the inside of said housing and a valve in said passageway.

5. The combination with an axle, a housing for the end portion thereof and a roller bearing between said axle and said housing, of a closure for the end of said housing, said closure having a lubricant chamber and a passageway extending from the lower portion of said chamber to the inside of said housing, a valve chamber below said lubricant chamber, a spring pressed valve in said valve chamber adapted to close said passageway, a hole through the top of said lubricant chamber and a plug for said hole accessible when said closure is in place, said valve having a stem opposite said plug in position to be depressed by said plug when the latter is placed in position.

Signed at Canton, Ohio, this 11th day of October, 1927.

OSCAR J. HORGER.